United States Patent
Cook et al.

(10) Patent No.: US 7,113,577 B2
(45) Date of Patent: Sep. 26, 2006

(54) CALLER IDENTIFICATION EMPLOYING A DIGITAL CONTENT SET

(75) Inventors: Fred S. Cook, Olathe, KS (US); Benjamin J. Parker, Overland Park, KS (US); Terry M. Frederick, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 168 days.

(21) Appl. No.: 10/688,349

(22) Filed: Oct. 17, 2003

(65) Prior Publication Data

US 2005/0084084 A1    Apr. 21, 2005

(51) Int. Cl.
*H04M 1/56*    (2006.01)
*H04M 15/06*    (2006.01)

(52) U.S. Cl. .............................. 379/142.01; 379/93.23; 379/245; 379/247

(58) Field of Classification Search ................ 455/414, 455/415; 379/142.01, 142.04, 142.05, 142.06, 379/142.14, 142.15, 93.17, 93.23, 142.16, 379/142.17, 245, 247
See application file for complete search history.

(56) References Cited

U.S. PATENT DOCUMENTS

| | | | |
|---|---|---|---|
| 5,724,412 A * | 3/1998 | Srinivasan | 379/93.23 |
| 5,761,279 A * | 6/1998 | Bierman et al. | 379/93.23 |
| 5,903,636 A | 5/1999 | Malik | |
| 5,907,604 A | 5/1999 | Hsu | |
| 5,963,626 A * | 10/1999 | Nabkel | 379/142.01 |
| 6,324,271 B1 * | 11/2001 | Sawyer et al. | 379/142.05 |
| 6,427,003 B1 | 7/2002 | Corbett et al. | |
| 6,442,262 B1 | 8/2002 | Moss et al. | |
| 6,553,110 B1 * | 4/2003 | Peng | 379/210.03 |
| 6,675,008 B1 * | 1/2004 | Paik et al. | 455/415 |
| 6,718,021 B1 * | 4/2004 | Crockett et al. | 379/93.23 |
| 2002/0067816 A1 * | 6/2002 | Bushnell | 379/201.02 |
| 2003/0022659 A1 * | 1/2003 | Mun et al. | 455/415 |
| 2003/0055981 A1 | 3/2003 | Requena et al. | |

FOREIGN PATENT DOCUMENTS

WO    WO 03/073730 A1    9/2003

* cited by examiner

*Primary Examiner*—Binh K. Tieu

(57) ABSTRACT

An information server according to one embodiment of the invention includes a communication interface configured to communicate over a communication network and a processing system connected to the communication interface. The processing system is configured to receive one or more digital content sets, receive a caller system identifier and a called system identifier from the caller system, select a digital content set from among the one or more digital content sets using the caller system identifier and the called system identifier, and provide the selected digital content set to a called system corresponding to the called system identifier prior to the caller system establishing a communication channel to the called system.

22 Claims, 8 Drawing Sheets

CALLER IDENTIFICATION EMPLOYING A DIGITAL CONTENT SET

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to caller identification.

2. Description of the Prior Art

In a telephone system, a caller can establish a connection to a called party. Originally, a telephone system did not identify the caller to the called party. In order to know the identity of the caller, the called party had no option other than answering the call. This had the disadvantage of not allowing the called party to decide whether to take to call. The called party in some circumstances might not want to take the call. In addition, the called party may not be prepared to talk to the caller, and there may be delay or confusion at the beginning of the conversation as the called party establishes the identity of the caller.

An improvement in the prior art is caller ID. In a caller ID system, the telephone system identifies the caller, and provides the caller's identification to the called party. The caller's identification includes the caller's telephone number, and can additionally include an account holder name, a company name, etc., that is registered to that telephone number. The caller's identification is displayed on the called party's telephone (or on a connected caller ID unit). This is an improvement, as it allows the called party to likely identify the caller, and may allow the called party to mentally prepare for conversation.

However, the caller ID system of the prior art also has disadvantages. The caller ID system merely provides the caller's registered identification to the called party. The called party may not be able to identify the caller from registered caller information, such as in the case of a call from an unknown person. The caller may still be relatively anonymous. In addition, the telephone number provided by caller ID merely identifies telephone owner's name (i.e., the account holder's name) and the telephone device used to make the call, and does not identify the actual caller if the actual caller is different than the telephone owner.

Furthermore, the prior art caller ID system cannot be controlled or configured by the caller, except that the caller can choose to disable the caller ID function. Moreover, the prior art caller ID system cannot provide personalized or flexible identification information.

SUMMARY OF THE INVENTION

The invention helps solve the above problems by providing an information server and caller identification method. An information server according to one embodiment of the invention comprises a communication interface configured to communicate over a communication network and a processing system connected to the communication interface. The processing system is configured to receive one or more digital content sets, receive a caller system identifier and a called system identifier from the caller system, select a digital content set from among the one or more digital content sets using the caller system identifier and the called system identifier, and provide the selected digital content set to a called system corresponding to the called system identifier prior to the caller system establishing a communication channel to the called system.

A caller identification method comprises the steps of receiving one or more digital content sets, receiving a caller system identifier and a called system identifier from the caller system, selecting a digital content set from among the one or more digital content sets using the caller system identifier and the called system identifier, and providing the selected digital content set to a called system corresponding to the called system identifier. The selected digital content set is provided prior to the caller system establishing a communication channel to the called system.

A software product for an information server comprises control software configured when executed by a processing system to direct the processing system to receive one or more digital content sets, receive a caller system identifier and a called system identifier from the caller system, select a digital content set from among the one or more digital content sets using the caller system identifier and the called system identifier, and provide the selected digital content set to a called system corresponding to the called system identifier. The selected digital content set is provided prior to the caller system establishing a communication channel to the called system. The software product further comprises a storage system that stores the control software.

BRIEF DESCRIPTION OF THE DRAWINGS

The same reference number represents the same element on all drawings.

DETAILED DESCRIPTION OF THE INVENTION

FIGS. 1–8 and the following description depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
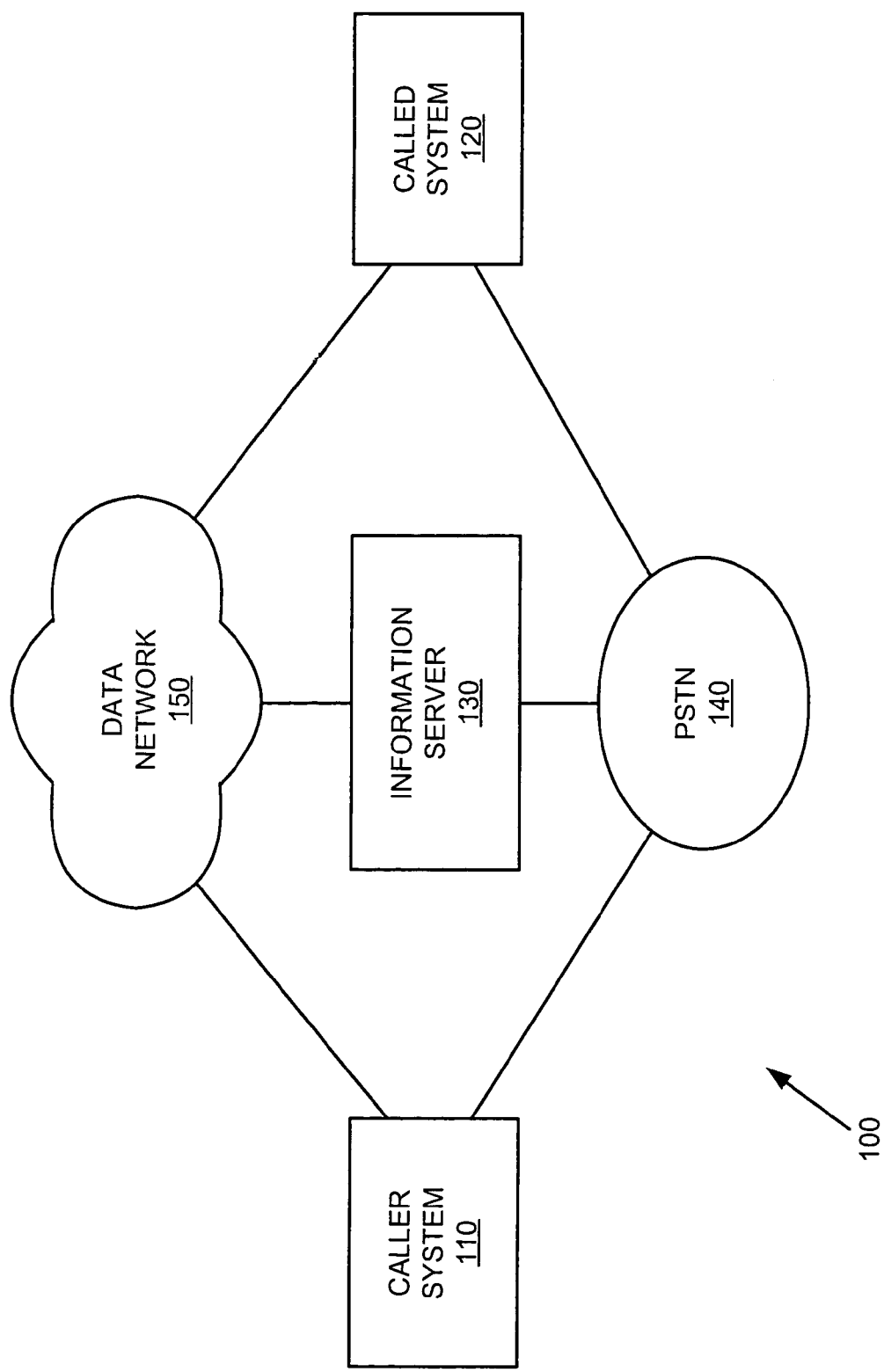
FIG. 1 illustrates a communication network according to one embodiment of the invention.

FIG. 1 illustrates a communication system 100 according to one embodiment of the invention. The communication system 100 includes a caller system 110, a called system 120, an information server 130, a public switched telephone network (PSTN) 140, and a data network 150. The caller system 110, the called system 120, and the information server 130 communicate over the PSTN 140, the data network 150, or both.

The PSTN 140 comprises a telephone network that includes a land-based telephone network, a wireless telephone network, or a combination thereof. The data network 150 comprises a network or interconnected networks that transports digital data. The data network 150 could comprise interconnected computer networks, including local-area networks (LANs), wide area networks (WANs), virtual private networks (VPNs), etc., and includes wire and wireless data networks. In one embodiment, the data network 150 comprises the Internet.

The caller system 110 and the called system 120 comprise devices that are capable of communicating over the PSTN 140 and over the data network 150. For example, the caller system 110 and the called system 120 may comprise a web-enabled phone, a computer system including a modem, a computer system capable of performing voice-over-Internet telephone calls, etc.

In operation, the caller system 110 initiates a telephone call and therefore establishes a communication channel to the called system 120. The called system 120 receives the communication, and the called party corresponding to the called system 120 desires to identify the caller (and not just the caller system 110). Before or during the call, the caller identification of the invention provides a digital content set from the caller system 110 to the called system 120. The digital content set is provided via a second, separate communication channel. The digital content set identifies the caller to the called party in some manner. By viewing the digital content set, the called party is able to identify the caller and prepare for conversation. In addition, the caller's employer, position, reason for calling, etc., may also be identified from the digital content set.

In the example shown, a telephone call is conducted via the PSTN 140 while the digital content set is provided via the data network 150. Alternatively, in another example the telephone call is a voice-over-IP (VoIP) telephone call, and both the telephone call and the provision of the digital content set are accomplished via the data network 150.

In one embodiment, the information server 130 stores one or more digital content sets, with a digital content set identifying the caller using the caller system 110. The information server 130 is capable of providing the stored digital content sets to the called system 120 during a telephone call, and therefore provides a caller identification function. Consequently, in addition to the telephone number of the caller system 110 (as provided by the caller ID of the prior art), the caller identification according to the invention is capable of providing the digital content set to the called system 120. Through provision of a digital content set, the called party may more accurately and reliably determine the identity of the caller. The information server 130 therefore acts as an intermediary, and can temporarily or permanently store a digital content set for use by the caller.

In another embodiment, the information server 130 retrieves a digital content set from an external source, such as on a server or storage, or on any other component of the communication system 100. In this embodiment, the information server 130 stores a digital content set identifier. The digital content set identifier comprises a number, address, or identifier that enables retrieval of the corresponding digital content set. The digital content set identifier in one embodiment is an IP address. In another embodiment, the digital content set identifier is a URL. The desired digital content set is requested and received from the external storage.

A digital content set can comprise a graphical image set, including a single image frame, such as a digital photograph or graphic, including text, images, designs, etc. Alternatively, the graphical image set comprises a plurality of image frames, such as a video clip or animation sequence, for example. The digital content set may include a photograph of the caller, may include a business-card or business identifier, a business trademark, etc. The digital content set may not only identify the particular caller, but in addition may identify an employer or institution that the caller is associated with. For example, the digital content set may include text/graphics identifying the caller as an officer or representative of an institution, or such as a doctor affiliated with a certain hospital, wherein both the doctor and the hospital are identified by the digital content set, etc. In addition, the digital content set may identify a family member or acquaintance who is using a public telephone. Other uses may additionally be contemplated.

In addition to providing identity, the digital content set may provide additional information to the called system 120. The additional information can include video, animations, graphics, text, or combinations thereof. In one example, the additional information comprises a company name, a company logo, and contact information. The digital content set can include information about additional data-oriented service extensions to the call. The additional information may further include special offers, news alerts, etc.

The caller system 110 provides the digital content set to the information server 130 before or during the telephone call. Consequently, the digital content set can be stored well in advance of a telephone call. In addition, a caller may store more than one digital content set.

An additional capability of the information server 130 is the ability to include one or more selection criterion in the lookup table 337. The selection criteria is further discussed in conjunction with Table 3, below. Consequently, a caller can customize the information server 130 to select a particular digital content set based on selection criteria previously entered by the caller. The selection criteria includes, but is not limited to, the time of day (TOD), the day of week (DOW), the day of year (DOY), an IP address of the caller system 110, an IP address of the called system 120, a user ID unique to a user of the caller system 110 (such as in an institutional setting), an IP address or URL of a digital content set, a caller verification identifier, the configuration of the called system 120, the ability of the called system 120 to receive or display images, the available communication bandwidth, the image format of the digital content set, the type or size of the digital content set, etc.

It should be noted that in one embodiment the selection criteria can include a caller identification. The caller identification can therefore be subsequently used in a lookup operation to select the particular digital content set.

The caller identification can be obtained when the communication is initiated. For example, the caller can register during the initiation process. Caller device registration can occur via a manual signal from the caller. For example, the caller identification can occur through a predetermined key sequence or voice command.

Alternatively, the caller can be automatically identified. For example, in one embodiment, automatic identification is performed by recognition of the caller through a current time of day or by recognition of a device identifier obtained from the caller's communication device (i.e., a handset identifier or an identity card, for example). Alternatively, in another embodiment, the automatic identification is achieved through an automated signal from the caller's communication device (i.e., an identifier message or identifier key generated by a cell phone, personal digital assistant, etc.), or in some other automated manner.

In one embodiment, the information server 130 pushes the digital content set to the called party (the information server 130 first obtains the digital content set if it is not stored on the information server 130). Therefore, the information server 130 transmits the actual digital content set to the called party. The push in this embodiment automatically occurs as a result of the call initiation.

In an alternative embodiment, the called party at the called system 120 pulls the digital content set from the information server 130 (or other storage). The information server 130 in this embodiment transmits the digital content set identifier to the called system 120. Subsequently, the called party may choose to pull the digital content set, using the received digital content set identifier, or ignore the digital content set identifier. The called party may pull the digital content set upon call initiation (i.e., when a telephone ring is generated in the called system 120), or at a later time.

Alternatively, the called party may use the telephone number of the caller system 110 (provided through the conventional caller ID function) in order to contact the information server 130 and pull the appropriate digital content set. However, the called party in this scenario must know of the caller identification capability of the invention, and must know how to contact the information server 130 and retrieve the digital content set.

Figure 2:
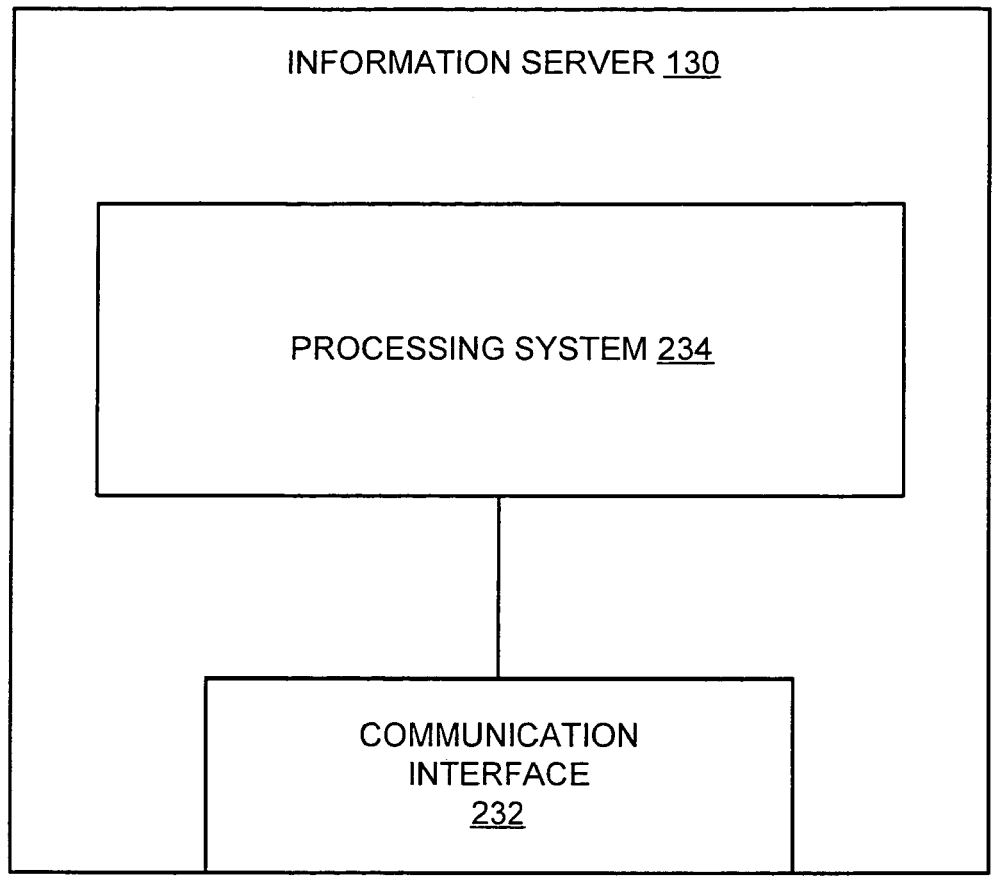
FIG. 2 illustrates an information server according to one embodiment of the invention.

FIG. 2 illustrates an information server 130 according to one embodiment of the invention. The information server 130 includes a communication interface 232 and a processing system 234 connected to the communication interface 232. The information server 130 may optionally include a user interface (not shown) connected to the processing system 234. The operation of the information server 130 is discussed below in conjunction with the flowcharts of FIGS. 5–8.

The communication interface 232 comprises any device capable of communicating with other network devices, including devices of the PSTN 140 and devices of the data network 150. The communication interface 232 could comprise a network interface card, a telephone interface circuit, etc., and combinations thereof. The communication interface 232 communicates over wires, optical fiber, or wireless links.

The processing system 234 could comprise a general purpose computer, a microprocessing system, a logic circuit, or some other general purpose or customized processing device. The processing system 234 may be distributed among multiple processing devices.

In operation, the information server 130 receives a digital content set from the caller system 110 (see FIG. 1). The digital content set may be received from the caller system 110 before initiation of a telephone call or may be received during telephone call initiation. The information server 130 further receives a caller system identifier and a called system identifier from the caller system 110. The caller system identifier and the called system identifier comprise numbers or addresses used to identify the respective devices. In one embodiment, the caller system identifier and the called system identifier comprise the caller system telephone number and the called system telephone number. In another embodiment, the caller system identifier and the called system identifier comprise Internet Protocol (IP) addresses. The information server 110 selects a digital content set using at least the caller system identifier (see FIG. 5), although in some embodiments additional criteria are included in the selection process (see FIGS. 6–8). The information server 110 provides the selected digital content set to the called system 120.

Figure 3:
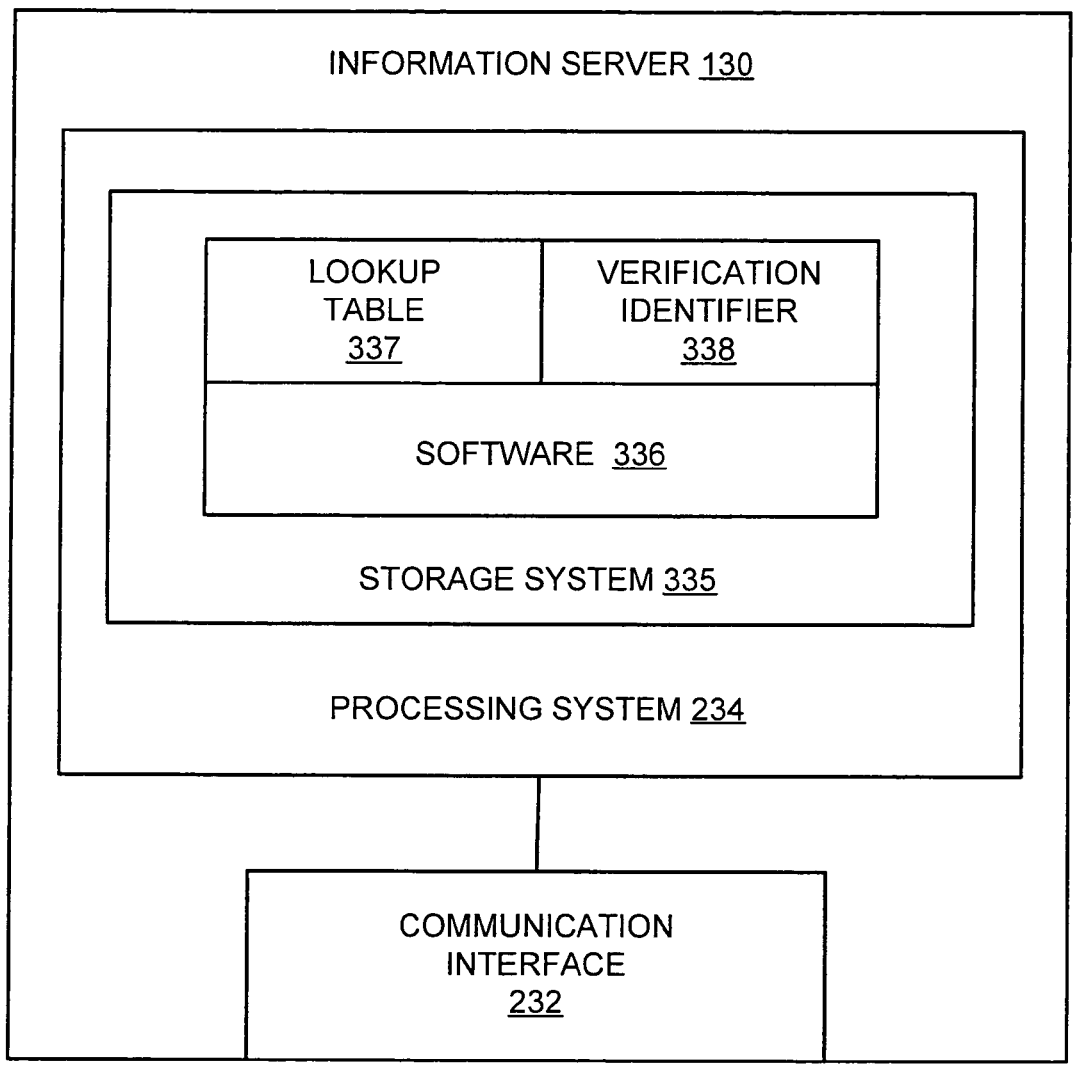
FIG. 3 illustrates an information server according to another embodiment of the invention.

FIG. 3 illustrates an information server 130 according to another embodiment of the invention. In this embodiment, the processing system 234 further includes a storage system 335. The storage system 335 in one embodiment is a component of the processing system 234, as shown. In another embodiment, the storage system 335 is a separate component in communication with the processing system 234. The storage system 335 could comprise a disk, tape, integrated circuit, server, or other memory device. The storage system 335 in one embodiment is distributed among multiple memory devices. The storage system 335 stores, among other things, the software 336. In addition, the storage system 335 according to the invention stores an lookup table 337 that is used by the information server 130 to provide a digital content set to the called system 120 and one or more verification identifiers 338.

The processing system 234 retrieves and executes software 336 from the storage system 335. The software 336 could comprise an application program, firmware, or some other form of machine-readable processing instructions. When executed by the processing system 234, the software 336 directs the processing system 234 to operate in accord with the invention.

The lookup table 337 is a data structure that stores caller system identifiers and corresponding digital content sets or digital content set identifiers (see Table 1 below). In an alternative embodiment, some or all of the digital content sets are externally stored. For example, the information server 130 may store IP addresses/digital content set identifiers that are used to access digital content sets stored on some manner of digital content or image server device. Moreover, the digital content storage may be divided among multiple devices and locations.

The caller system identifier in one embodiment is used to select a digital content set. In other embodiments, the called system identifier, and other selection criterion, are also used to select digital content sets, in addition to the caller system identifier.

The verification identifier 338 is a certificate, code, password, personal identification number (PIN), etc., that uniquely identifies the caller. The verification identifier 338 is used to verify the identity of the caller, and not just the identity of the caller system, as is done in the prior art caller ID system. The verification identifier 338 of the information server 130 therefore must be matched with a corresponding verification identifier received from the caller system 110 before the caller system 110 can employ the caller identification function. The corresponding verification identifier of the caller is stored on the caller system 110 or is entered into the caller system 110 by the caller. The corresponding verification identifier of the caller is transmitted to the information server 130 during call initiation and is used by the information server to verify the identity of the caller. In one embodiment, if an improper verification identifier is supplied by the caller, or if no verification identifier is supplied, the information server 130 is rendered inaccessible to that caller.

Table 1 below is a first embodiment of the lookup table 337, and includes the telephone number of the caller system 110 and a digital content set (or digital content set identifier that is used to retrieve the actual digital content set).

TABLE 1

| CALLER SYSTEM IDENTIFIER | DIGITAL CONTENT SET |
| --- | --- |
| 123-456-7890 | DIGITAL CONTENT SET 1 |
| 123-123-4567 | DIGITAL CONTENT SET 2 |

By using the caller system identifier as the input to the lookup table 337, the information server 130 may lookup the digital content set that will be provided to the called system 120. In this embodiment, a caller can store and provide only a single digital content set to the called party.

Table 2 below is a second embodiment of the lookup table 337, and includes the caller system identifier, the called system identifier, and a digital content set or digital content set identifier.

TABLE 2

| CALLER SYSTEM IDENTIFIER | CALLED SYSTEM IDENTIFIER | DIGITAL CONTENT SET |
| --- | --- | --- |
| 123-456-7890 | 123-456-8888 | DIGITAL CONTENT SET 1 |
| 123-123-4567 | 123-654-0987 | DIGITAL CONTENT SET 2 |

By using the caller system identifier and the called system identifier as the inputs to the lookup table 337, the information server 130 may lookup the digital content set that will be provided to the called system 120. In one example, based on an existing and familiar relationship between the caller and the called party, the lookup table 337 selects an informal digital content set. Alternatively, if the called party is a business contact, the lookup table 337 in this example is programmed to select a formal digital content set to be provided to the called party.

Table 3 below is a third embodiment of the lookup table 337, and includes the caller system identifier, the called system identifier, one or more selection criterion, and a digital content set or digital content set identifier. Although only one selection criterion column is shown, it should be understood that the lookup table 337 may include multiple selection criteria.

TABLE 3

| CALLER TELEPHONE NUMBER | CALLED TELEPHONE NUMBER | SELECTION CRITERION | DIGITAL CONTENT SET |
| --- | --- | --- | --- |
| 123-456-7890 | 123-456-8888 | TOD | SET 1 |
| 123-123-4567 | 123-654-0987 | USER ID | SET 2 |

The selection criterion entry of the lookup table 337 allows the caller (i.e., the user of the information server 130) to add additional selection criteria upon which a digital content set lookup is conducted, as previously discussed. For example, the selection criterion entry may allow the information server 130 to select from among multiple digital content sets stored for a single user.

The lookup table 337 in one embodiment can be accessed and modified by the caller. For example, the caller may access the lookup table 337 through a web page in order to make selections and configure the table. The caller may add, delete, or modify the selection criterion and may add, delete, or modify the called system identifiers.

Figure 4:
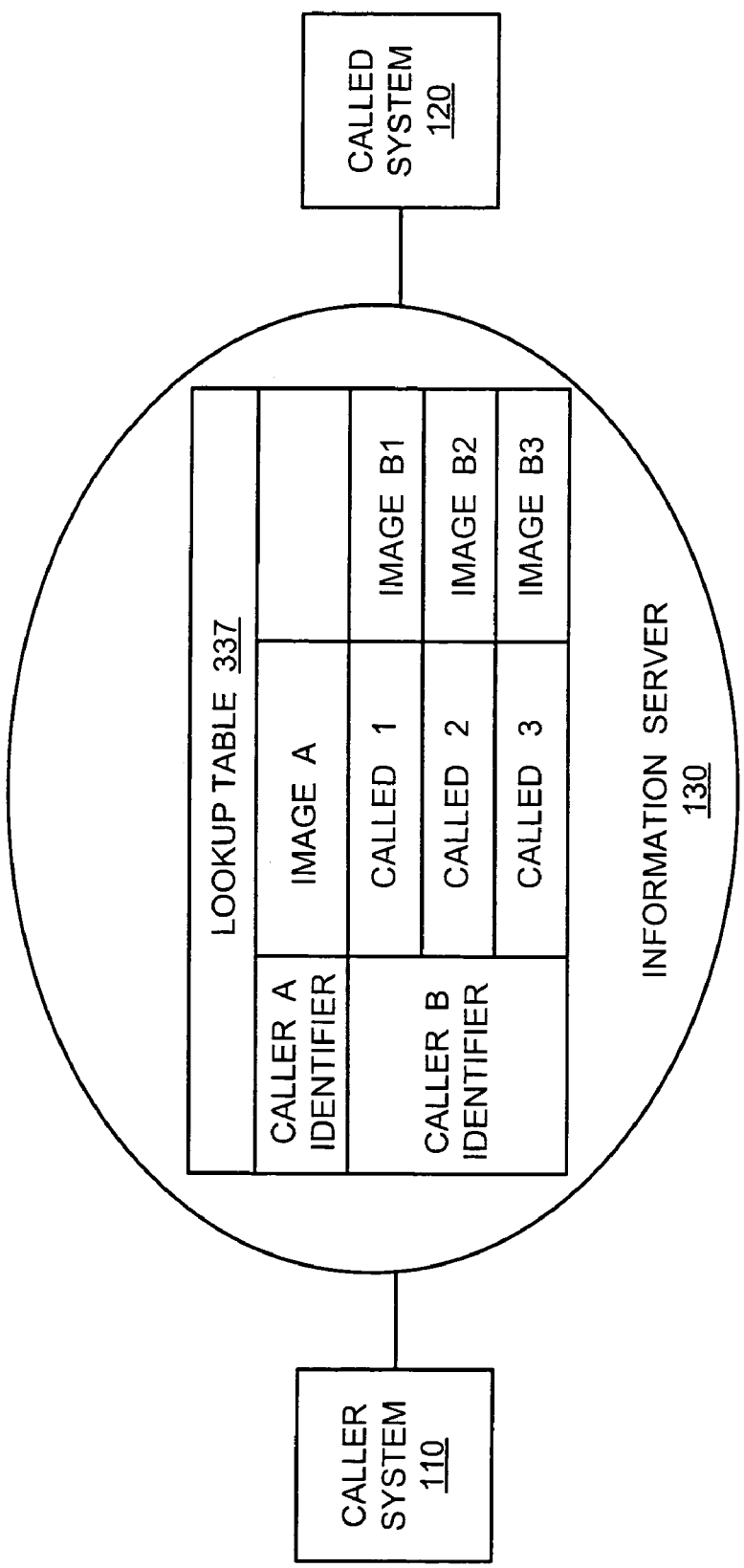
FIG. 4 illustrates a lookup table according to another embodiment of the invention.

FIG. 4 illustrates a lookup table 337 according to another embodiment of the invention. In the figure, the PSTN 140 and the data network 150 are not shown for the purpose of simplicity and clarity. In a first example, caller A initiates a telephone call to the called system 120, wherein caller A only has a single entry (i.e., a single digital content set) in the lookup table 337 for the caller identification operation. Therefore, when caller A initiates a telephone call, the lookup table 337 only receives the caller system identifier (i.e., the telephone number of the caller system 110) in order to retrieve the digital content set A.

In a second example, caller B has three digital content sets stored in the lookup table 337. Caller B therefore may specify a particular digital content set to be used for a particular telephone call. In this example, the telephone number of the caller system 110 and the telephone number of the called system 120 (i.e., the caller system identifier and the called system identifier) are used to select a digital content set. For example, the digital content set B1 is selected and provided to the called system 120 if the telephone number of the called system 120 matches the "CALLED 1" entry.

Figure 5:
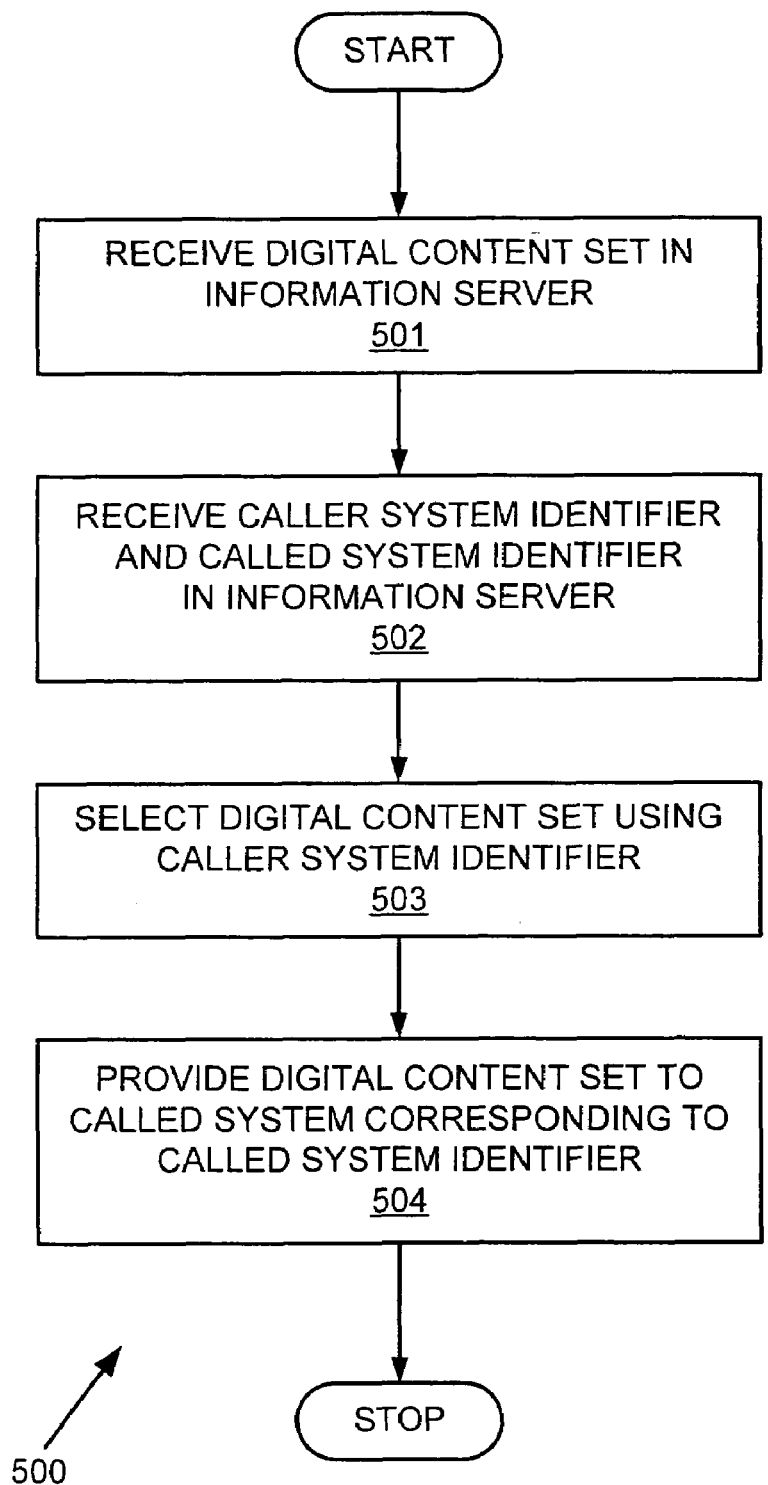
FIG. 5 is a flowchart of a caller identification method according to another embodiment of the invention.

FIG. 5 is a flowchart 500 of a caller identification method according to another embodiment of the invention. In step 501, the information server 130 receives a digital content set from the caller system 110. The digital content set identifies the caller using the caller system 110. The digital content set in one example is received in advance of a communication by the caller, and in another example is received during establishment of a communication channel by the caller system 110. The received digital content set is stored at the information server 130 in one embodiment. In another embodiment, the received digital content set is stored externally, with a digital content set identifier being stored at the information server 130.

In step 502, the information server 130 receives a caller system identifier that corresponds to the caller system 110 and receives a called system identifier that corresponds to the called system 120. The called system identifier in one embodiment is the telephone number of the called system 120. The information server 130 receives the called system identifier from the caller system 110, and may be received via either the PSTN 140 or the data network 150. Likewise, the information server 130 also receives a called system identifier that corresponds to the called system 120.

This step in one embodiment further includes receiving a verification identifier from the caller system 110. The verification identifier received from the caller matches a corresponding verification identifier 338 stored in the information server 130 (see FIG. 3). The verification identifier in one embodiment identifies the caller system 110, and comprises a digital certificate, a serial number, etc., that is embedded in the caller system 110. In another embodiment, the verification identifier identifies the caller using the caller system 110, and must be entered into the caller system 110 by the caller, such as through a keypad or other user interface. The verification identifier in one embodiment comprises a personal identification (PIN) number, a password or pass code, etc. The verification identifier in another embodiment is encrypted before being transmitted from the caller system 110 to the information server 130.

In step 503, the information server 130 selects a digital content set. In this embodiment, the selection step selects a digital content set corresponding to the caller system identifier, where the caller has only one stored digital content set for use with the caller identification according to the invention. The caller system identifier therefore selects the digital content set.

In step 504, the information server 130 provides the selected digital content set to the called system 120. The provision may occur at any time during initiation of the telephone call and prior to the caller system 110 establishing a communication channel to the called system 120. The provision of the digital content set may persist during the telephone call. In one example, when the called system 120 receives the telephone call, the called system 120 displays the caller digital content set. In another example, when the call is received, the called system 120 indicates that the caller digital content set is available to be displayed (through some manner of visual display). The called party therefore elects whether to display the digital content set.

Figure 7:
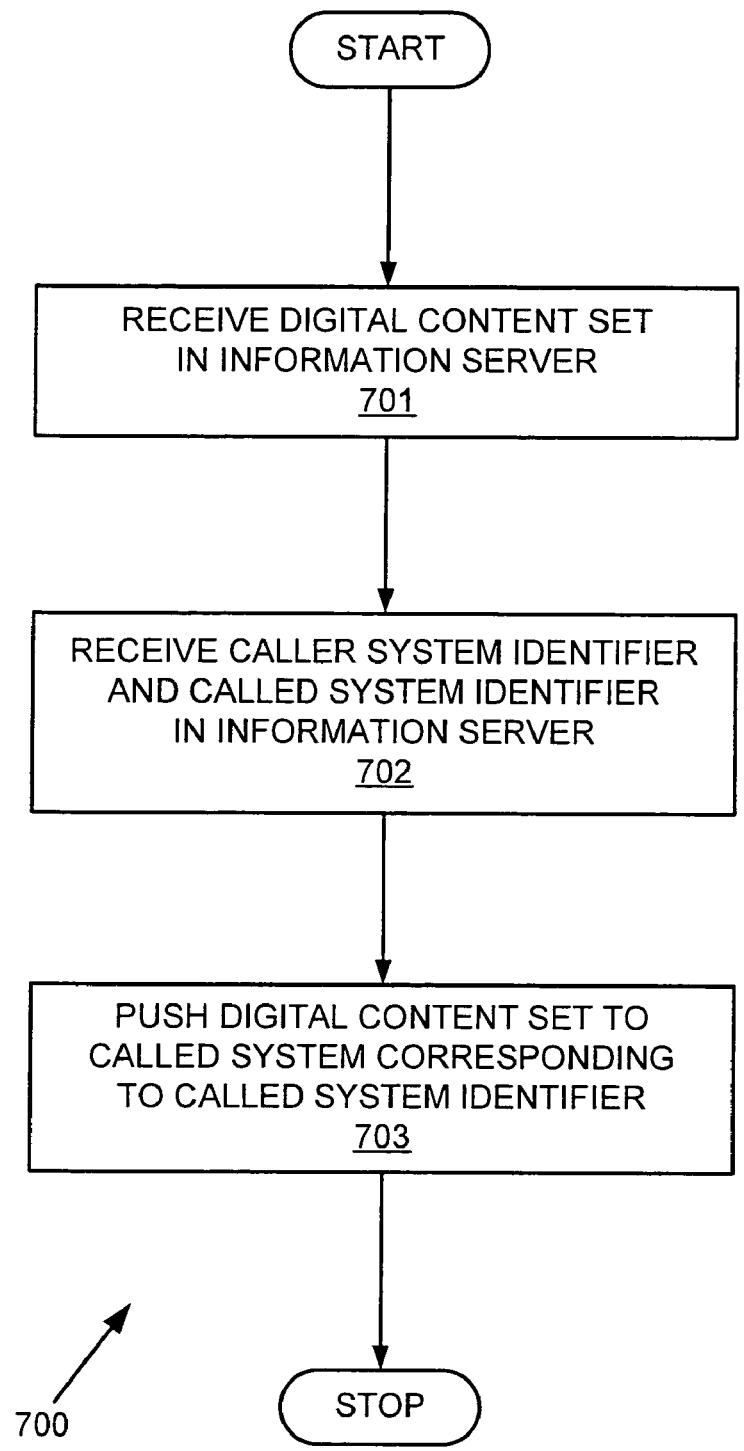
FIG. 7 is a flowchart of a caller identification method according to yet another embodiment of the invention.

In one embodiment, the information server 130 provides the digital content set directly to the called system 120, i.e., the digital content set is pushed to the called system 120 (see FIG. 7 and the accompanying discussion). Alternatively, in another embodiment the information server 130 transmits a digital content set identifier to the called system 120 (see FIG. 8 and the accompanying discussion), and the called party chooses whether to retrieve the digital content set by using the digital content set identifier (i.e., the digital content set is pulled by the called system 120).

It should be understood that in another alternative embodiment the caller identification according to the invention is implemented in a peer-to-peer manner, wherein the information server 130 is not required. The peer-to-peer implementation may be applied to each of the methods of FIGS. 5–8. In a peer-to-peer implementation, the digital content set is stored on the caller system 110, and the caller system 110 provides the digital content set to the called system 120 upon initiation of a telephone call. A mediating information server is not required in the peer-to-peer caller identification according to the invention.

Figure 6:
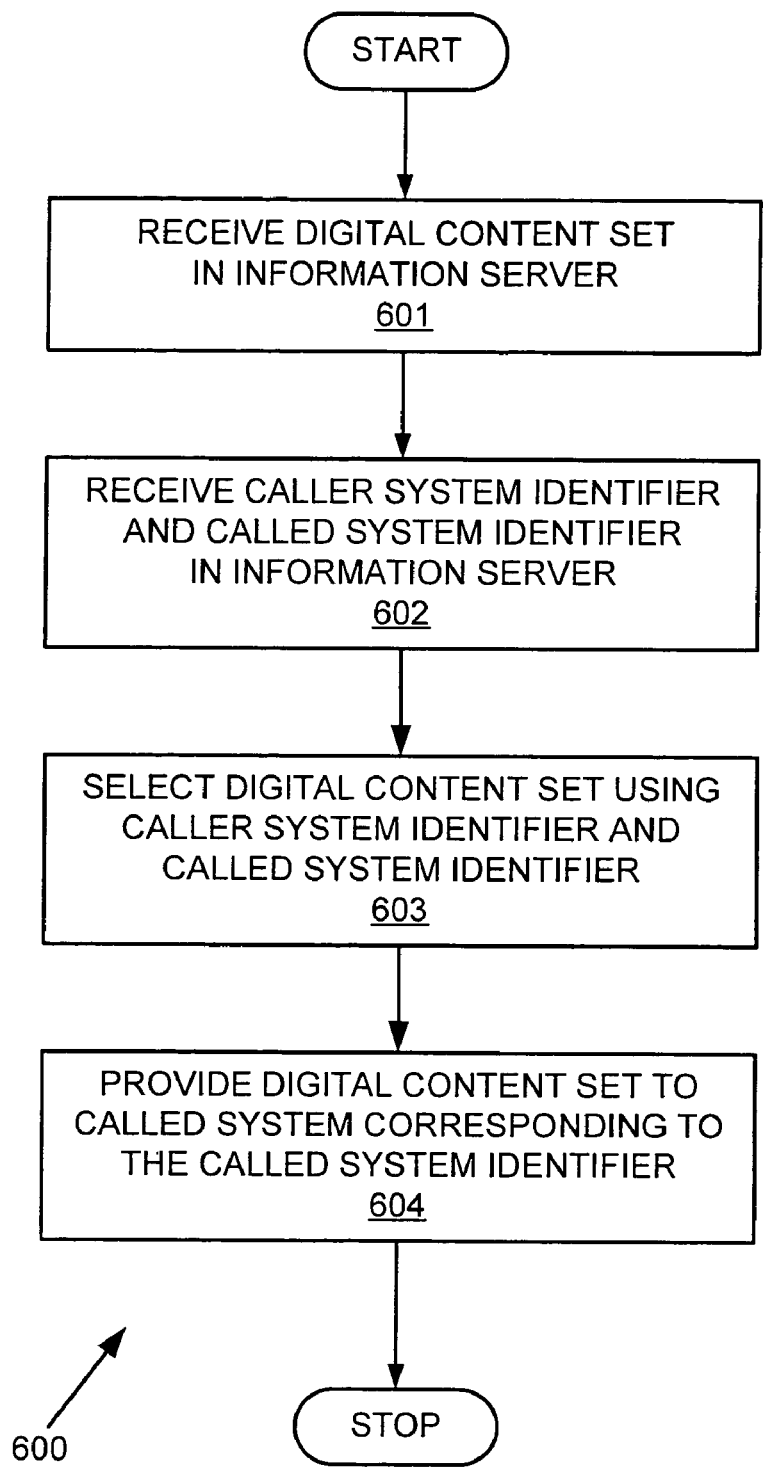
FIG. 6 is a flowchart of a caller identification method according to yet another embodiment of the invention.

FIG. 6 is a flowchart 600 of a caller identification method according to yet another embodiment of the invention. In step 601, the information server 130 receives a digital content set from the caller system 110, as previously discussed.

In step 602, the information server 130 receives a caller system identifier and a called system identifier, as previously discussed.

In step 603, the information server 130 selects a digital content set. In this embodiment, the selection step selects a digital content set using both the caller system identifier and the called system identifier, or using the caller system identifier, the called system identifier, and one or more selection criterion (see tables 2 and 3 above and the accompanying discussions).

In step 604, the information server 130 provides a digital content set to the called system 120, as previously discussed. The digital content set may be pushed by the information server 130 or pulled by the called system 120.

FIG. 7 is a flowchart 700 of a caller identification method according to yet another embodiment of the invention. In step 701, the information server 130 receives a digital content set from the caller system 110, as previously discussed.

In step 702, the information server 130 receives a caller system identifier and a called system identifier, as previously discussed.

In step 703, the information server 130 provides a digital content set to the called system 120. In this embodiment, the selected digital content set is pushed to the called system 120, i.e., the information server 130 automatically transmits the digital content set to the called system 120 upon initiation of a communication channel between the caller system 110 and the called system 120. The called system 120 therefore receives the digital content set prior to the call, and does not choose whether to receive the digital content set.

Figure 8:
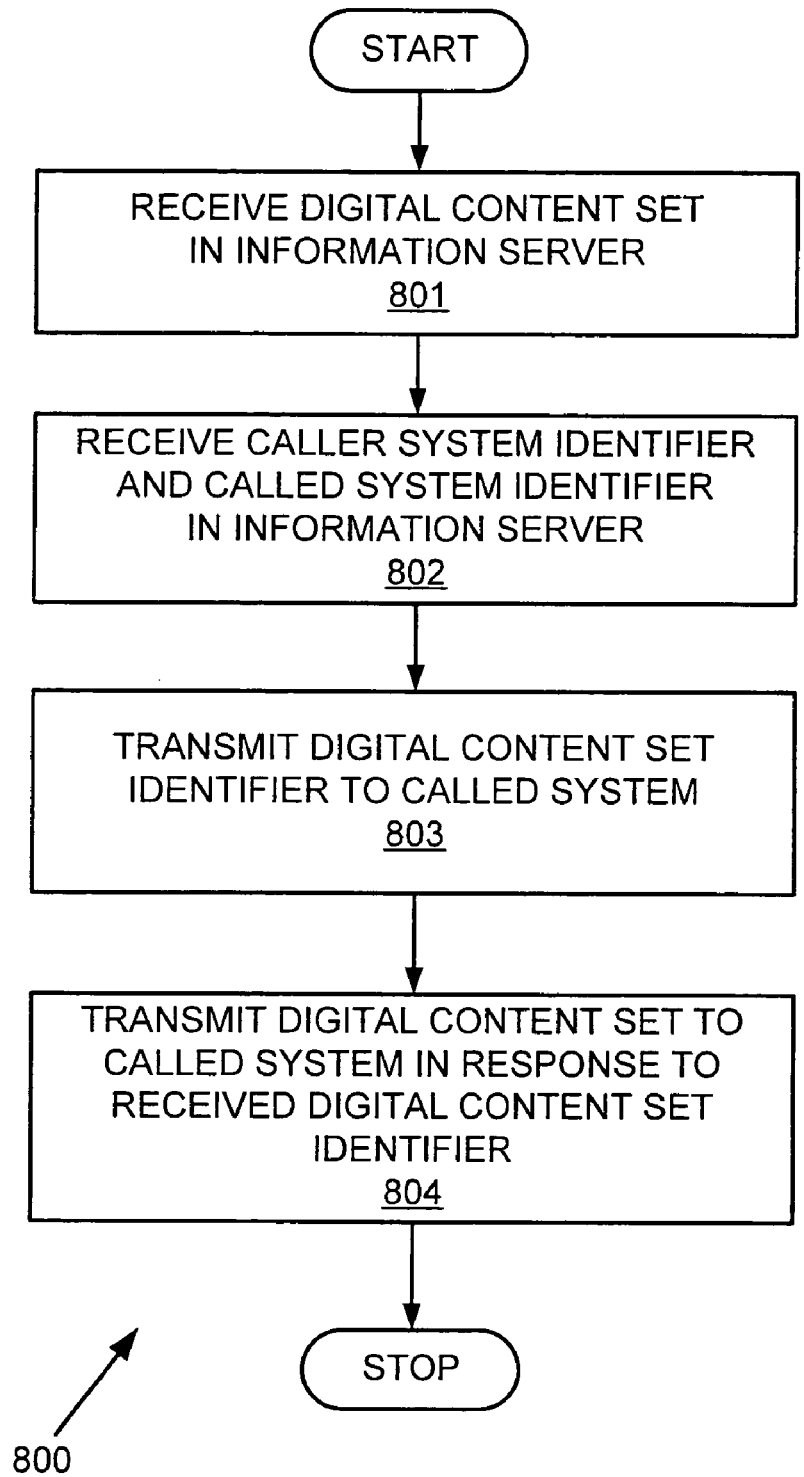
FIG. 8 is a flowchart of a caller identification method according to yet another embodiment of the invention.

FIG. 8 is a flowchart 800 of a caller identification method according to yet another embodiment of the invention. In step 801, the information server 130 receives a digital content set from the caller system 110, as previously discussed.

In step 802, the information server 130 receives a caller system identifier and a called system identifier, as previously discussed.

In step 803, the information server 130 transmits a digital content set identifier to the called system 120 as part of the initiation of a communication channel between the caller system 110 and the called system 120. The digital content set identifier in one embodiment is transported as part of the caller ID information. In another embodiment, the digital content set identifier is relayed to the called system 120 by the information server 130 when the communication channel is initiated. In one example, the information server 130 relays the digital content set identifier to the called system 120 through the data network 150. The digital content set identifier in one embodiment is an IP address of the digital content set. In another embodiment, the digital content set identifier is a URL of the digital content set.

In step 804, the information server 130 transmits the digital content set to the called system 120 in response to a corresponding received digital content set identifier. The information server 130 receives the digital content set identifier when the called system 120 chooses to pull the digital content set. In response, the information server 130 uses the digital content set identifier to retrieve the selected digital content set and transmit the digital content set to the called system 120. Therefore, the called system 120 pulls the digital content set from the information server 130. However, it should be noted that the selection of the digital content set is still done in the information server 130, and is performed when the caller system identifier and the called system identifier are received by the information server 130 (i.e., the information server 130 selects the digital content set and provides the selected digital content set identifier to the called system 120). The called system 120 may choose to retrieve the digital content set or may choose to ignore the digital content set identifier.

The caller identification according to the invention may be employed in a telecommunications system that conducts telephone calls and communicates with a data network. The caller identification may be used in conjunction with a conventional caller ID system, or may be used independently.

The caller identification according to the invention differs from the prior art in that the prior art caller ID can only determine and provide the telephone number of the caller telephone device. The prior art caller ID cannot identify the caller, and instead identifies only the calling telephone device. The prior art caller ID is not capable of providing an image of the caller, and is not capable of providing identifying text, images, videos, animations, or other digital content.

The caller identification according to the invention provides several benefits. The caller identification provides a digital content set to the called party, with the digital content set identifying the caller. The caller identification according to the invention can be employed in conjunction with the conventional caller ID of the prior art. The caller identification according to the invention can be employed in conjunction with a caller ID telephone answering device, wherein the caller ID answering device records a digital content set identifier for later retrieval. In addition, the digital content set may provide other information, including text, graphics, video, animation, etc. Furthermore, the caller may customize the caller identification, and may select from among multiple digital content sets. The selection may be done automatically by the information server 130, and operates on selection criteria provided by the caller. Moreover, the caller identification according to the invention is user customizable, and the user may configure the caller identification to provide personalized and flexible identification information.

What is claimed is:

1. An information server, comprising:
    a communication interface configured to communicate over a communication network; and
    a processing system connected to the communication interface and configured to receive one or more digital content sets, receive a caller system identifier and a called system identifier from the caller system, receive and decrypt an encrypted verification identifier from the caller system, select a digital content set from among the one or more digital content sets using the caller system identifier, the called system identifier, and the decrypted verification identifier, and provide the selected digital content set to a called system corresponding to the called system identifier prior to the caller system establishing a communication channel to the called system.

2. The information server of claim 1, wherein the selected digital content set comprises a graphical image set.

3. The information server of claim 2, wherein the processing system is configured to push the graphical image set to the called system.

4. The information server of claim 2, wherein the called system pulls the graphical image set from the information server.

5. The information server of claim 2, further comprising an lookup table that correlates the caller system identifier, the called system identifier, and one or more selection criterion to the graphical image set.

6. The information server of claim 2, wherein the processing system is configured to compare a first verification identifier with a second verification identifier received from the caller system and verify a caller identity corresponding to the caller system.

7. A caller identification method, comprising the steps of:
    receiving one or more digital content sets;
    receiving a caller system identifier and a called system identifier from the caller system;
    receiving and decrypting an encrypted verification identifier from the caller system;
    selecting a digital content set from among the one or more digital content sets using the caller system identifier, the called system identifier, and the decrypted verification identifier; and
    providing the selected digital content set to a called system corresponding to the called system identifier;
    wherein the selected digital content set is provided prior to the caller system establishing a communication channel to the called system.

8. The method of claim 7, wherein the selected digital content set comprises a graphical image set.

9. The method of claim 8, with the selecting step further comprising:
    inputting the caller system identifier into a lookup table;
    inputting the called system identifier into the lookup table; and
    outputting the graphical image set from the lookup table, with the graphical image set corresponding to the caller system identifier and the called system identifier.

10. The method of claim 8, with the selecting step further comprising:
    inputting the caller system identifier into a lookup table;
    inputting the called system identifier into the lookup table;
    inputting one or more selection criterion into the lookup table; and
    outputting the graphical image set from the lookup table, with the graphical image set corresponding to the caller system identifier, the called system identifier, and the one or more selection criterion.

11. The method of claim 8, wherein the providing step comprises pushing the graphical image set to the called system.

12. The method of claim 8, wherein the providing step comprises pushing a graphical image set identifier to the called system, with the called system pulling the graphical image set using the graphical image set identifier.

13. The method of claim 8, with the providing step further comprising:
    transmitting a graphical image set identifier to the called system, with the graphical image set identifier corresponding to the graphical image set;
    receiving a digital content set identifier from the called system;
    retrieving the graphical image set corresponding to the graphical image set identifier; and
    transmitting the graphical image set to the called system in response to the received digital content set identifier, wherein the called system pulls the graphical image set.

14. The method of claim 8, further comprising the step of comparing a first verification identifier with a second verification identifier received from the caller system and verifying a caller identity corresponding to the caller system.

15. A software product for an information server, the software product comprising:
    control software configured when executed by a processing system to direct the processing system to receive one or more digital content sets from a caller system, receive a caller system identifier and a called system identifier from the caller system, receive and decrypt an encrypted verification identifier from the caller system, select a digital content set from among the one or more digital content sets using the caller system identifier, the called system identifier, and the decrypted verification identifier, and provide the digital content set to a called system corresponding to the called system identifier, wherein the digital content set is provided prior to the caller system establishing a communication channel to the called system; and
    a storage system that stores the control software.

16. The software product of claim 15, wherein the digital content set comprises a graphical image set.

17. The software product of claim 15, wherein the control software further directs the processing system to input the caller system identifier into a lookup table, input the called system identifier into the lookup table, and output the graphical image set from the lookup table, with the graphical image set corresponding to the caller system identifier and the called system identifier.

18. The software product of claim 15, wherein the control software further directs the processing system to input the caller system identifier into a lookup table, input the called system identifier into the lookup table, input one or more selection criterion into the lookup table, and output the graphical image set from the lookup table, with the graphical image set corresponding to the caller system identifier, the called system identifier, and the one or more selection criterion.

19. The software product of claim 15, wherein the control software further directs the processing system to push the graphical image set to the called system.

20. The software product of claim 15, wherein the control software further directs the processing system to transmit a graphical image set identifier to the called system, with the called system pulling the graphical image set using the graphical image set identifier.

21. The software product of claim 15, wherein the control software further directs the processing system to receive a graphical image set identifier from the called system, retrieve the graphical image set corresponding to the graphical image set identifier, and transmit the graphical image set to the called system, wherein the called system pulls the graphical image set.

22. The software product of claim 15, wherein the control software further directs the processing system to compare a first verification identifier with a second verification identifier received from the caller system and verify a caller identity corresponding to the caller system.

* * * * *